June 26, 1962
W. T. RENTSCHLER
3,040,643
PHOTOGRAPHIC INTRA-LENS SHUTTER WITH INCORPORATED
ELECTRIC EXPOSURE-METER
Filed Feb. 29, 1956
2 Sheets-Sheet 2
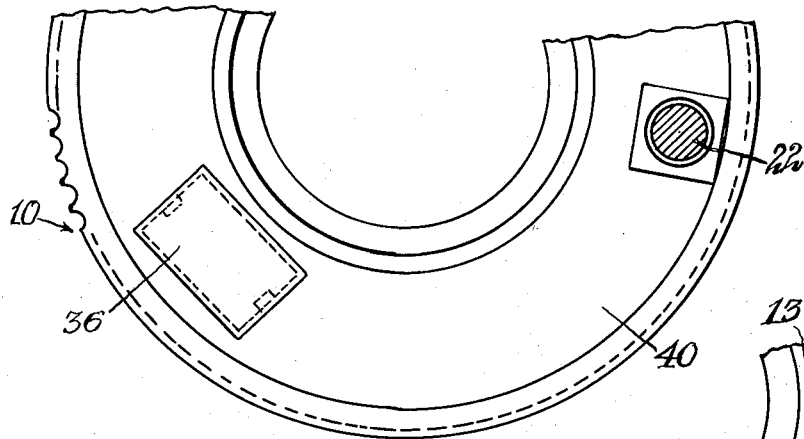
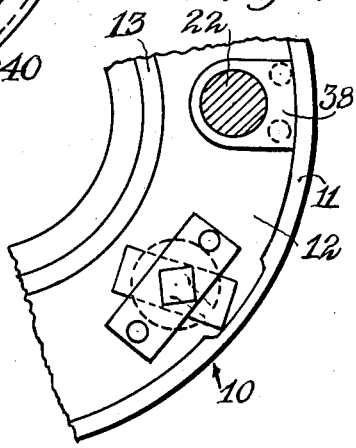
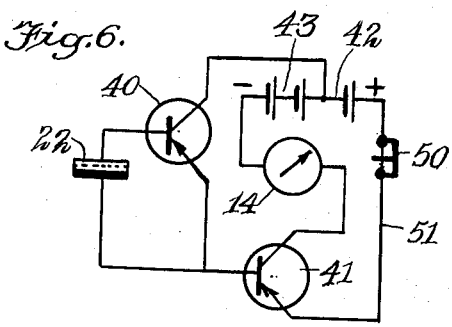
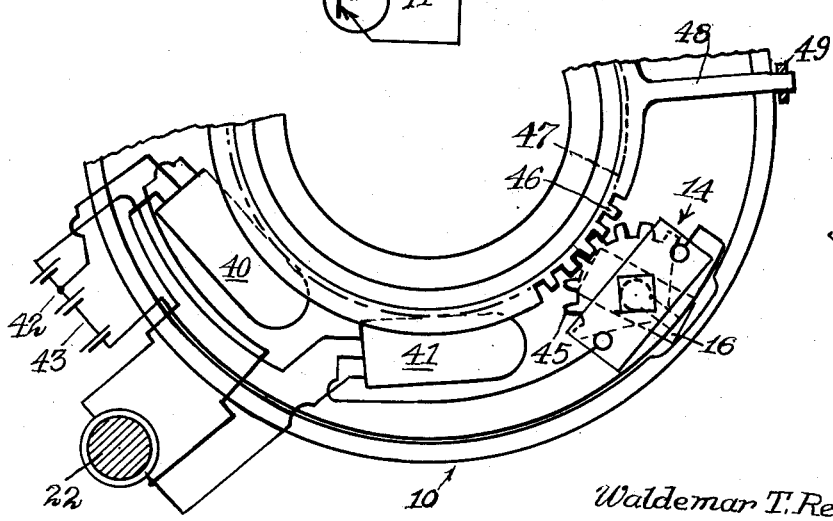
INVENTOR.
Waldemar T. Rentschler
BY
Munn, Liddy, Nathanson + March
ATTORNEYS

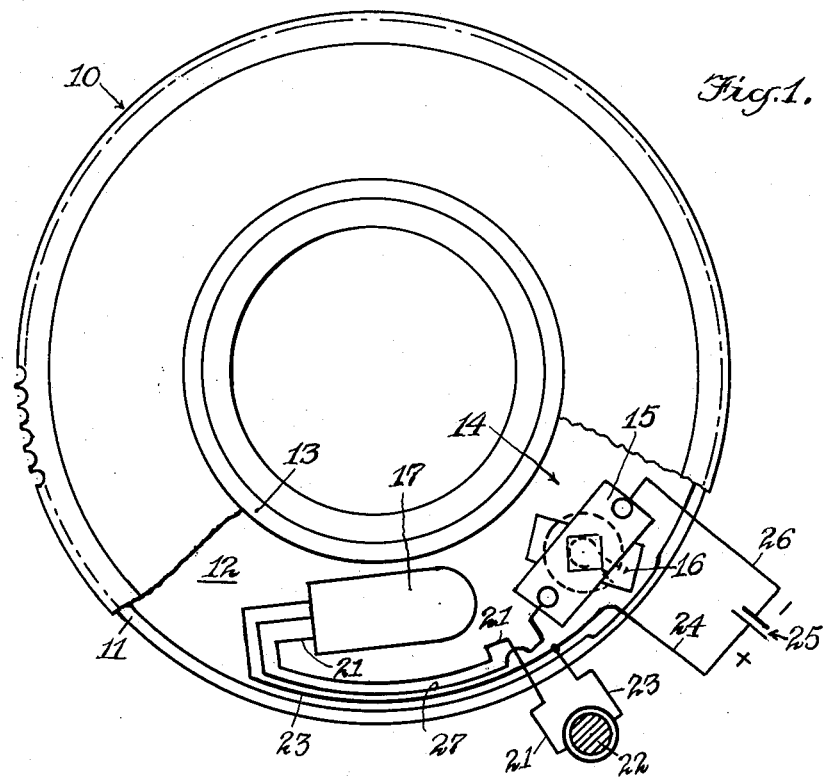
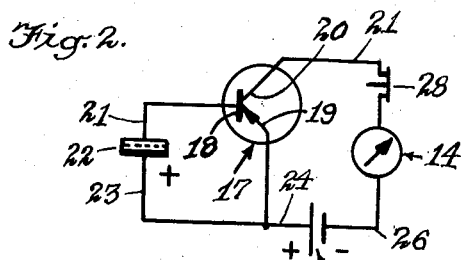
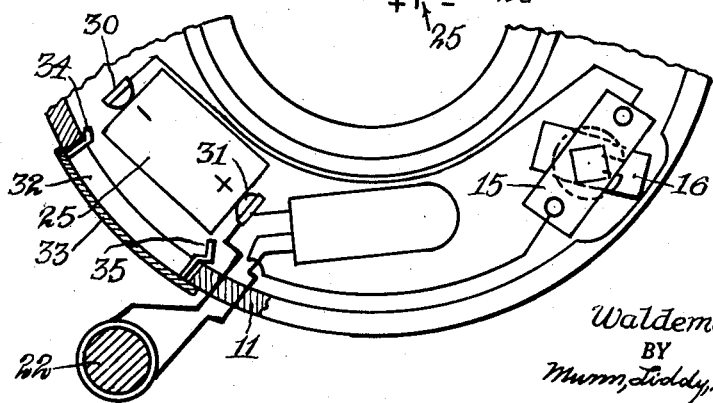

United States Patent Office 3,040,643
Patented June 26, 1962

3,040,643
PHOTOGRAPHIC INTRA-LENS SHUTTER WITH INCORPORATED ELECTRIC EXPOSURE-METER
Waldemar T. Rentschler, Calmbach (Enz), Germany, assignor to Alfred Gauthier G.m.b.H., Calmbach (Enz), Germany, a corporation of Germany
Filed Feb. 29, 1956, Ser. No. 568,647
Claims priority, application Germany Mar. 11, 1955
3 Claims. (Cl. 95—64)

This invention relates to photographic shutter structures, and more particularly to shutter structures, such as intra-lens shutters, which are provided with electrical exposure meters.

Heretofore, in the manufacture of photographic intra-lens shutters, difficultly has been experienced in maintaining the relatively small, standard shutter housing sizes when it was desired to incorporate in the shutter the electrical measuring device or instrument movement of an electrical exposure meter. Due to the small dimensions of the housings very little room was available for such an instrument movement, and the problem was further aggravated by the necessity for providing an instrument movement design of high sensitivity and delicate construction. The problem of lack of space was so acute that there was danger of adversely affecting the reliability of operation of the instrument movement, and also the overall accuracy of the exposure meter.

The above difficulties and drawbacks have been obviated by the present invention, and an object of the invention is to provide an improved photographic intralens shutter structure with incorporated electrical exposure meter, which structure may retain the conventional, desirably small dimensions while at the same time the exposure device is characterized by high working accuracy and great reliability.

In accordance with the invention this object is accomplished by the provision, in the interior of the shutter housing, of at least one electronic amplifier unit or element, said element being connected on the one hand with a photo-sensitive device and on the other hand with the electrical measuring device or instrument movement.

By the provision of the electronic amplifier means, the relatively weak currents from the photosensitive device are not depended on directly to actuate the instrument movement but instead the latter is actuated by the much greater currents flowing through the electronic amplifier, which now is responsive to the photosensitive device. By this organization it is possible to make the electrical measuring device relatively small and compact while still obtaining an accuate response of said device as well as a reliable operation characteristic of the entire exposure meter or system.

The incorporation of the electronic amplifier in the shutter housing provides an additional advantage in that the shutter assembly as a complete unit is still interchangeable with other shutter assemblies and accordingly may be substituted therefor in various types of cameras without requiring alteration or modification of the camera.

It is preferred, in accordance with the invention, to constitute the electronic amplifier of transistors, which owing to their small sizes may be readily incorporated in shutter housings of conventional small dimension. Additionally, the transistors provide an advantage in that they require no heating in order to function, and therefore there is obviated the necessity for providing a source of heating current. Moreover, the rugged characteristics of transsistors by which they can withstand physical shock and vibration, make them advantageous for use in camera structures since rough handling or dropping of the camera will not tend to render the transistors inoperative.

Further, in accordance with the invention, by locating within the shutter housing the source of potential for the electronic amplifier, it is possible to further constitute the shutter assembly as a complete and independent unit, thus making possible interchangeability and lack of dependence on special provisions or modifications of the camera itself, as already mentioned above. The transistors require only small potentials, which may be readily supplied by batteries of very small size, such as are readily adaptable to incorporation in the shutter structure.

Also, in accordance with the invention, where the battery source is incorporated in the shutter housing, provision is made for the quick and easy interchangeability and replacement of the battery, preferably by the use of a clip-type holder having contacts engageable with those of the battery. As disclosed herein, in accordance with the invention, a portion of the wall of the shutter housing adjacent the battery clip is made removable in order to enable a user of the camera to easily and quickly replace the battery without taking apart the shutter housing or exposing the shutter mechanism to damage or deformation. The removable wall portion of the shutter housing may be either at the front or at the side of the latter.

By the provision of the electronic amplifier means it is further possible to effect a sufficient output so that a movable part of the measuring device or instrument movement may be utilized and depended upon to carry out a certain amount of mechanical work. The said movable part as shown herein is connected with a setting member of the camera, by which adjustment of the diaphragm or time setting may be carried out. Preferably such adjustment, in the case of the diaphragm, is effected in conjunction with the diaphragm setting member or ring, thereby to automatically change the light proportions in response to operation of the exposure meter.

An advantageous coupling between the electrical instrument movement and the diaphragm setting ring is disclosed, in the form of a pinion carried by the instrument movement and engaging gear teeth on the periphery of the ring, thereby to actuate the latter when the instrument movement is energized. I have found that, as disclosed in the preferred embodiment of the invention illustrated herein, the photo-sensitive element may also be advantageously arranged within the shutter housing, since the provision of the electronic amplifier now makes it unnecessary to have a high photo-electric current such as is obtainable from a large photo element. Instead, because of the electronic amplifier, use may now be made of very small electric currents which are produceable by small-sized photo elements, thereby enabling the photo element, having a small, light-sensitive face, to be arranged at the front plate of the shutter housing without requiring a large space. Where the shutter mechanism is of a simple type I have found it to be possible to arrange the photo element on the base plate of the shutter, and to provide either a clearance opening or a light-admitting opening in the front plate of the shutter housing, directly in front of the photo element.

To conserve the energy of the battery, I provide in the circuit thereof an on-off switch which may close the circuit only during the actual time of use of the measuring device.

Other features and advantages will hereinafter appear.

In the drawings accompanying this specification several embodiments of the invention are illustrated. Similar parts have been given similar reference characters wherever possible, and all shutter parts not directly concerned with the invention have been omitted.

FIGURE 1 is a front elevational view of an improved photographic intra-lens shutter made in accordance with the invention, portions of the front plate and speed setting ring of the shutter being removed to reveal interior details. In the ring space of the shutter housing there is shown an electronic amplifier element and a connected electrical measuring device or instrument movement.

FIG. 2 is a schematic circuit diagram of the electronic amplifier as employed in FIG. 1.

FIG. 3 is a fragmentary front elevational view showing a lower portion of a shutter mechanism similar to that of FIG. 1, wherein a battery is also provided within the shutter housing, said battery being removable through a side opening.

FIG. 4 is a view like FIG. 3 but showing a removable front wall portion of the shutter housing, through which the battery may be removed.

FIG. 5 is a fragmentary front elevational view of a shutter housing similar to that of FIG. 1, but wherein there is incorporated cascaded electronic amplifiers and a mechanical driving connection between the instrument movement and diaphragm setting ring.

FIG. 6 is a schematic circuit diagram of the circuit of the amplifier illustrated in FIG. 5.

FIG. 7 is a fragmentary front elevational view of a shutter wherein the photosensitive element is incorporated in the shutter housing and carried by the base plate of the shutter mechanism.

Referring to FIGS. 1 and 2 there is shown a shutter housing generally designated by the numeral 10, having a cylindrical side wall 11 and carrying therein a base plate 12 on which the usual shutter mechanism may be mounted, said base plate having a central nozzle portion 13.

Carried by the base plate 12 is an electrical measuring device or instrument movement 14 comprising a moving coil system 15 having a movable coil 16. The instrument movement 14 constitutes part of an electrical exposure meter heretofore provided in intra-lens shutters of the present type.

In accordance with the present invention I provide an electronic amplifier in conjunction with the instrument movement 14 to drive the latter, said electronic amplifier being connected with a photo-electric cell or element to receive current therefrom and to be responsive thereto. I prefer to constitute the electronic amplifier of one or more transistors, and accordingly as shown in FIGS. 1 and 2 I provide a transistor 17 having a base 18, emitter 19 and collector 20. By virtue of its small size the transistor 17 may be conveniently mounted within the shutter housing 10 between the outer wall 11 thereof and the nozzle 13 of the base plate. As seen in FIGS. 1 and 2 the base 18 of the transistor 17 may be connected by a wire 21 to the negative side of a photo-sensitive element 22 whose positive side is connected by a wire 23 to the emitter 19. The wire 23 is connected by a wire 24 to the positive side of a battery 25 the negative side of which is connected by a wire 26 to the instrument movement 14. From the latter a wire 27 leads to the collector 20 of the transistor, and an on-off switch 28 may be inserted in the wire 27 to interrupt the continuity of the battery circuit and preserve the battery when the amplifier and electrical exposure meter are not being used.

In accordance with the invention the photo element 22 and the battery 25 may be disposed either at the shutter housing 10 or separated therefrom. Considering this latter, as seen in FIG. 1, the photo cell 22 and battery 25 are disposed exteriorly of the shutter housing 10, the latter containing the instrument movement or measuring device 14 and the transistor 17. With such an arrangement, the wires 21, 23, 24 and 26 may be brought out of the shutter housing 10 in any suitable and desired manner, as for example in the same way that flash supply wires are brought out at the present time.

By the present invention either the battery 25 or the photo cell 22 or both may also be mounted within the shutter housing 10 in the ring space provided between the outer wall 11 of the housing and the nozzle 13 of the base plate. As seen in FIG. 3, the battery 25 is carried by a holding device comprising spring clips 30 and 31 carried in the housing 10, said clips being also arranged to constitute insulated contacts by means of which connections are established to the battery from the amplifier circuit. With this organization the battery 25 may be readily quickly removed from the clips 30, 31 and a new battery installed whenever this becomes necessary. As seen in FIG. 3 I provide an opening 32 in the side wall 11 of the housing 10 and provide a removable closure 33 having a hooked anchoring finger 34 and a resilient, ribbed anchoring finger 35 by which the closure may be removably secured over the opening 32. Thus, when it is desired to remove the battery 25, the user of the camera merely removes the side cover plate 33 to provide access to the interior of the shutter housing 10.

In place of the removable side plate 33, as seen in FIG. 4, I may alternatively provide a removable front plate 36 on the shutter housing 10, to provide access to the interior of the housing for replacement of the battery 25.

By virtue of the current requirements for the transistor being small, the battery 25 may have small dimensions and this fact, together with the small size of the transistor 17 makes it possible to incorporate these two components within the shutter housing 10 while still maintaining the equipment and facilities of known shutters which do not have incorporated therein exposure meters. Thus, a shutter organization made in accordance with the invention can contain, apart from the incorporated exposure meter amplifying means and battery, also an escapement mechanism for obtaining exposure times, a delayed action device for self exposures as well as a contact arrangement for flash firing. It may be necessary in accomplishing such an arrangement, to combine the escapement mechanism and delayed action device into a single unit, as is currently done in a well known manner. Also, a compact arrangement of the gear trains may also be effected in a well known manner by arranging the gears and pinions of the escapement mechanism and delayed action device in various layers one upon the other.

I have found it extremely advantageous to provide the electronic amplifier comprising the transistor 17 as an intermediary between the photo element 22 and the instrument movement 14 in that it enables the latter to be made in a more insensitive manner than was possible heretofore where the instrument movement was connected directly to the photo element. Thus, the production of the instrument movements may be carried out more easily and economically, and it may be more reliable in its functioning, and made to have smaller dimensions while at the same time resulting in a greater overall reliability of shutter functioning while retaining small shutter dimensions.

Moreover, by the inclusion of the electronic amplifier it is possible to use a smaller photo element with a smaller light sensitive surface, and such element may be arranged at a favorable location. Also, it is now possible to place before the photo element a light scattering member, as for example an opal glass, which enables a maximum uniformity in the response of the photo element where light values of marked contrast are encountered.

By the incorporation of the electronic amplifier in the interior of the organization housing 10 the shutter structure is made less dependent on other factors which are incorporated in the camera, since essential components of the exposure meter arrangement may be provided within the shutter housing. In certain situations most unfavorable to the securing of additional space within the shutter housing 10, the photo element 22 and the battery 25 may be located exteriorly thereof and accommodated in the camera structure. This arrangement, wherein the photo element is carried by the camera, is known at the present time and is not considered of any great disadvantage, and the same is true of the location of the battery 25 since flash attachments for cameras commonly carry batteries in such a way that they are invisible from the outside. Thus, the incorporation of the electronic amplifier in the shutter housing 10 does not require the solution of any new problems of camera construction if the photo cell 22 and battery 25 are to be located exteriorly of the shutter housing and to be carried by the camera structure. As a consequence, acceptance of the present shutter organization incorporating the electronic amplifier will not meet with resistance from the trade.

Considering the organization illustrated in FIG. 3 wherein the battery 25 is incorporated within the shutter housing 10, it is seen that the shutter assembly is made more independent of the camera construction.

In accordance with the invention, complete independence of the shutter assembly from the camera construction may be obtained by incorporation of not only the battery 25 in the housing 10 but also incorporation of the photo cell element 22, and such an organization is illustrated in FIG. 7. In this figure the photo cell 22 is shown as carried by a bracket 38 within the shutter housing 10, said bracket being secured to the base plate 12 of the shutter mechanism between the outer wall 11 of the housing and the nozzle 13 of the base plate. By virtue of the reduction in size which it is possible to carry out in the photo element 22 due to the provision of the electronic amplifier comprising the transistor 17, space may usually be readily found within the shutter housing 10 to accommodate the photo cell.

With the organization shown in FIG. 7 the photo cell 22 may project through an opening in the front plate of the shutter housing 10, or if desired it may be contained wholly within the shutter housing, directly in back of a light-admitting opening in the front plate.

Instead of the photo cell 22 being mounted within the housing 10 it may be mounted exteriorly thereof, on the front plate 40 of the housing, as shown in FIG. 4, and this arrangement also provides for complete independence of the shutter assembly from the camera.

The advantages of the shutter organization shown in FIGS. 4 and 6 are that the wiring of the complete light measuring system may be accomplished as simply as possible. Also, testing and adjustment of the complete exposure meter system can be carried out while the cover plate is still removed from the shutter housing, in the simplest possible manner.

Another embodiment of the invention is illustrated in FIGS. 5 and 6 wherein a cascade or multi-stage electronic amplifier is provided, thereby to effect a greater drive of the electrical measuring device or instrument movement with minute photo cell currents.

As shown, within the shutter housing 10 I provide a pair of transistors 40 and 41, connected to the measuring device 14, to the photo cell 22, and to battery sources 42 and 43. The circuit diagram of the electronic amplifier of FIG. 5 is clearly shown in FIG. 6 and needs no further detailed explanation, generally.

It will be understood that, by virtue of the staged amplification, very minute currents from the photo cell 22 will result in relatively great currents through the instrument movement 14, thereby to provide appreciable power for carrying out mechanical work. I utilize this, in accordance with the invention, to automatically adjust setting means associated with the shutter mechanism. For example, as seen in FIG. 5, I provide a pinion 45 connected to the movable coil 16 of the instrument movement 14, said pinion meshing with teeth 46 on an adjusting ring 47 which may, for example, constitute the diaphragm adjusting ring of the shutter. Advantageously, the instrument movement 14 may thus be made to control the diaphragm setting, since the setting ring 47 normally operates smoothly at all times and therefore adjustment of the diaphragm setting may be reliably carried out. However it is within the province of the invention to drive other setting means, as for example the setting for the exposure times, by the incorporation of a suitable driving mechanism. It will be understood that the diaphragm setting 47 has the usual connection arm 48 by which it is joined to a part 49 of the diaphragm operating device.

With the organization shown in FIG. 5 a change in the intensity of the illumination of the subject, influencing the photo element, will result in a change of the angular position of the coil 16 and accordingly a corresponding change in the angular position of the diaphragm setting ring 47 by virtue of the gearing 45, 46. Where a constant exposure time setting is provided, this results in a fully automatic adjustment of the camera through control of the diaphragm opening.

To conserve the energy of the batteries 42 and 43 an on-off switch 50 is provided in the wire 51, FIG. 6, leading from the emitter of the transistor 41 to the battery 42. The switch 50, and also the switch 28 shown in FIG. 2, may be optionally controlled by hand or by a running down movement of the shutter, or by a grasp necessary for putting the camera into position for picture taking. When closing the on-off switch, the electrical meter is immediately ready for operation, because the transistors function without the necessity for heat and therefore require no starting time for their operation.

It will be readily understood that, with the above structures, I have provided a novel and improved intra-lens shutter organization with incorporated exposure meter, said shutter organization being relatively small in dimension and extremely compact, and having great reliability of operation. The shutter organization may be made completely independent of components of the camera itself so that it is readily applicable to various types and kinds of cameras.

Variations and modifications may be made within the scope of the claims, and portions of the improvements may be used without others.

I claim:

1. In a photographic camera having an intra-lens shutter housing including a base plate having a shutter mechanism secured thereto, said base plate having a central nozzle portion extending forwardly therefrom, an annular side wall extending from said base plate and spaced from said central nozzle portion, and a front wall extending between said annular side wall and said central nozzle portion, said front wall being spaced from said base plate, an electrical measuring device disposed in said housing adjacent said side wall, a photo-sensitive element producing an electric voltage the value of which depends on the intensity of the light impinging on said element, said photo-sensitive element being secured to said base plate in said housing, said housing having a light-admitting opening in the front of said housing disposed forwardly of said photo-sensitive element whereby the photo-sensitive element is responsive to light coming toward the housing from the front thereof, a completely transistorized amplifier disposed in the shutter housing, said amplifier being electrically connected to said photo-sensitive element and said measuring device, said measuring device having a rotatable part responsive to current flowing through it as supplied by said amplifier, said rotatable part having a pinion attached thereto, exposure setting means including a gear ring substantially concentric with the axis of the shutter housing, said ring engaging said pinion to be driven thereby, a battery for said amplifier disposed within said housing, said housing having a removable wall adjacent said battery to enable replacement of the battery.

2. The invention as defined in claim 1 in which the said removable wall is disposed at a side of the housing.

3. The invention as defined in claim 1 in which the said removable wall is disposed at the front of the housing.

References Cited in the file of this patent

UNITED STATES PATENTS 2,041,843    Lifschitz _____ May 26, 1936

(Other references on following page)

UNITED STATES PATENTS

| | | |
|---|---|---|
| 2,261,532 | Tonnies | Nov. 4, 1941 |
| 2,279,723 | Tonnies | Apr. 14, 1942 |
| 2,297,262 | Tonnies | Sept. 29, 1942 |
| 2,412,424 | Rath | Dec. 10, 1946 |
| 2,518,717 | Rath | Aug. 15, 1950 |
| 2,613,282 | Schaife | Oct. 7, 1952 |
| 2,647,201 | Contento | July 28, 1953 |
| 2,655,848 | Gray | Oct. 20, 1953 |
| 2,745,021 | Kurshan | May 8, 1956 |

FOREIGN PATENTS

| | | |
|---|---|---|
| 502,908 | Great Britain | Mar. 28, 1939 |
| 756,282 | Germany | Feb. 23, 1953 |